No. 785,346. PATENTED MAR. 21, 1905.
A. J. ALLEN.
FERTILIZER DISTRIBUTER.
APPLICATION FILED JULY 16, 1904.
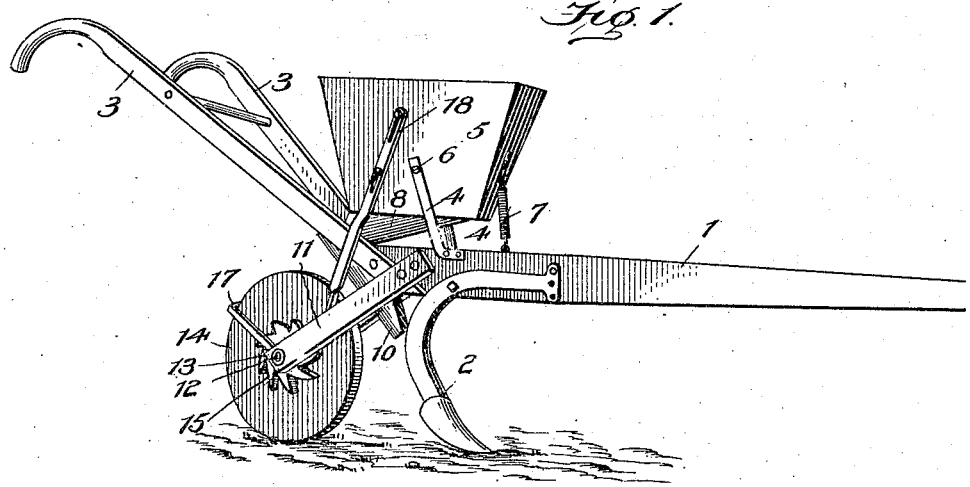
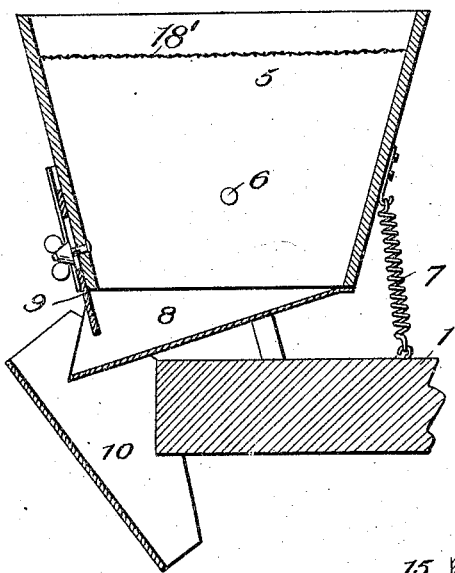
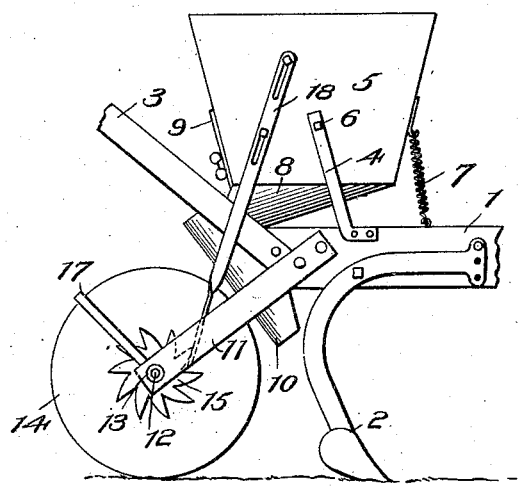
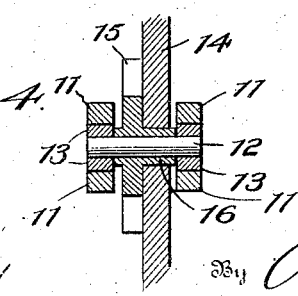
Witnesses
Edwin L. Bradford
H. Kaufman
Inventor
Andrew J. Allen
By A. E. Hancock
Attorney No. 785,346. Patented March 21, 1905.

UNITED STATES PATENT OFFICE.

ANDREW J. ALLEN, OF SHADYDALE, GEORGIA.

FERTILIZER-DISTRIBUTER.

SPECIFICATION forming part of Letters Patent No. 785,346, dated March 21, 1905.

Application filed July 16, 1904. Serial No. 216,831.

*To all whom it may concern:*

Be it known that I, ANDREW J. ALLEN, a citizen of the United States, residing at Shadydale, in the county of Jasper and State of Georgia, have invented new and useful Improvements in Fertilizer-Distributers, of which the following is a specification.

This invention has relation to fertilizer-distributers; and it consists in the novel construction and arrangement of its parts, as hereinafter shown and described.

The object of the invention is to provide a fertilizer-distributer having a plow for opening a furrow and an elevated hopper pivotally mounted and counterbalanced upon supports and adapted to deposit the fertilizer in the furrow opened by said plow, said hopper having its forward end connected to a spring, which has a tendency to keep the said forward end of the hopper down. The distributer is provided with a wheel which is adapted to run in the said furrow and has attached to its side a ratchet-disk. An arm attached to the side of the hopper is adapted to engage said ratchet-disk at its lower end. Consequently as the disk is rotated each ratchet thereof successively forces the lower end of said arm out, which causes the rear end of said hopper to tilt down. By so arranging the hopper the weight thereof does not come upon said ratchet-disk, and consequently there is no unnecessary jar upon the ratchets, and the draft-animals may operate the device with ease.

In the accompanying drawings, Figure 1 is a perspective view of the fertilizer-distributer. Fig. 2 is a vertical longitudinal sectional view of the hopper and its attachments. Fig. 3 is a side elevation of the hopper, plow, and hopper-operating wheel; and Fig. 4 is a transverse sectional view of the intermediate portion of the said operating-wheel.

The fertilizer-distributer consists of the beam 1, to which is attached the plow 2 and the handles 3 3. Upwardly-extending irons 4 4 are attached to the beam, and between the upper ends of said irons the hopper 5 is pivotally mounted, as at 6, said pivotal point 6 being located equidistant from the front and rear ends of said hopper, so that the said hopper is counterbalanced upon the irons 4 4. The coil-spring 7 is attached at its upper end to the forward end of the hopper 5 and at its lower end to the beam 1. The tension of said spring 7 has a tendency to maintain the forward end of the hopper 5 in a depressed position. The bottom of the hopper 5 is open and is provided with a sheet-metal spout 8, which extends beyond the rear end of said hopper. The sliding plate 9 is adjustably attached to the rear end of the hopper 5. The lower end of said plate enters the spout 8 and is adapted to regulate the flow of the fertilizer therefrom. A chute 10 is attached to the rear end of the beam 1. The upper end of said chute receives the rear end of the spout 8, and the lower end of said chute passes behind the plow 2 in such manner as to deposit the fertilizer in the furrow opened by said plow.

Arms 11 are bolted at their upper ends to the rear end of the beam 1 and extend down and back behind the end of said beam. The lower ends of said arms 11 are connected by a shaft 12, the ends of which rest in suitable bearings 13. A wheel 14 has attached to one side a ratchet-disk 15, said disk being preferably made in the form of a casting and having an integral collar 16, which passes through the center of the wheel 14 and receives the shaft 12. The scraper-iron 17 is connected at its ends to the arm 11 and passes up over the edge of the wheel 14. Thus the rear ends of said arms 11 are thoroughly braced and held together. An arm 18 is adjustably attached at its upper end to the side of the hopper 5 and passes down the lower end of said arm, engaging the ratchets of the disk 15.

It will thus be seen that as the disk 15 rotates with the wheel 14 the ratchets thereof engaging the lower end of the arm 18 will force the said arm 18 out and cause the rear end of the hopper 5 to descend. As soon as the lower end of the arm 18 escapes the end of one of the ratchets of the disk 15 the spring 7 will pull the forward end of the hopper 5 down with a jerk. The jolt thus given will cause the fertilizer to fall from the end of the spout 8 into the chute 10, from which part it falls into the furrow opened by the plow 2.

The hopper 5 is provided near the top with a sieve 18', which prevents clods of earth, &c., from passing to the bottom of the hopper when the fertilizer is placed therein, and thereby choke the outlet of the same.

Having described my invention, what I claim as new, and desire to secure by Letters Patent, is—

1. A fertilizer-distributer consisting of a hopper pivotally mounted and counterbalanced, a spring actuating one end of said hopper to depress the same and a means for actuating the opposite end of said hopper to depress the same.

2. A fertilizer-distributer consisting of a hopper pivotally mounted and counterbalanced, a spring actuating one end of said hopper to depress the same, an arm attached to said hopper and engaging a rotating disk to depress the opposite end of said hopper.

3. A fertilizer-distributer consisting of a hopper pivotally mounted, a spring actuating one end of said hopper to depress the same and a means actuating the opposite end of said hopper to depress the same.

4. A fertilizer-distributer consisting of a hopper pivotally mounted, a spring actuating one end of said hopper to depress the same, an arm attached to said hopper and engaging a rotating disk to depress the opposite end of said hopper.

5. A fertilizer-distributer consisting of a hopper pivotally mounted, a spring actuating one end of said hopper to depress the same, an arm attached to said hopper and adapted to depress the opposite end thereof, a ratchet-disk suitably journaled and engaging said arm said disk having a side collar and a wheel located upon said collar.

In testimony whereof I have signed my name to this specification in the presence of two subscribing witnesses.

ANDREW J. ALLEN.

Witnesses:
    H. C. BLACKWELL,
    R. S. DAVIS.